Sept. 19, 1933.        D. M. ERVIN        1,927,232
DIRIGIBLE HEADLIGHT
Filed Sept. 1, 1931        2 Sheets-Sheet 1
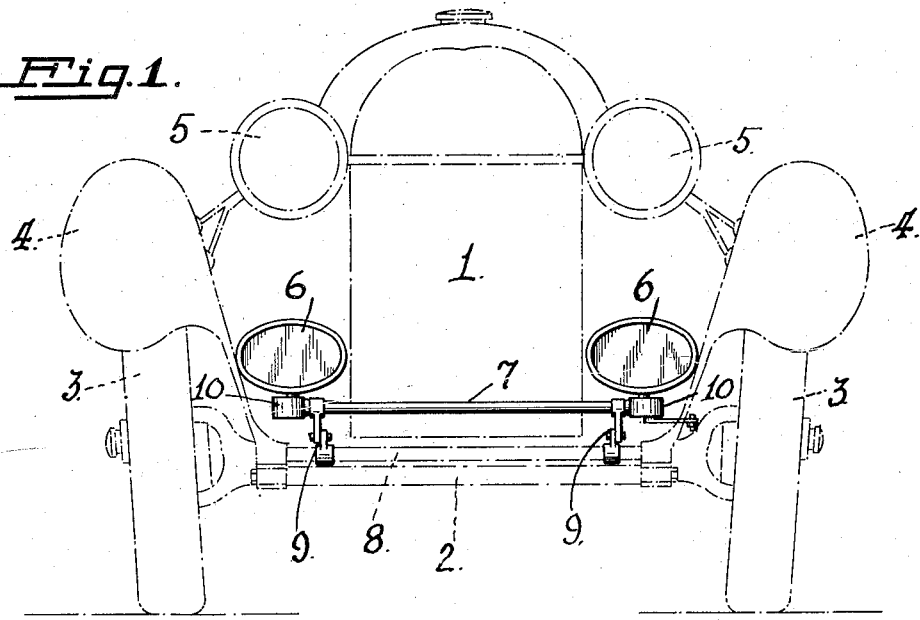
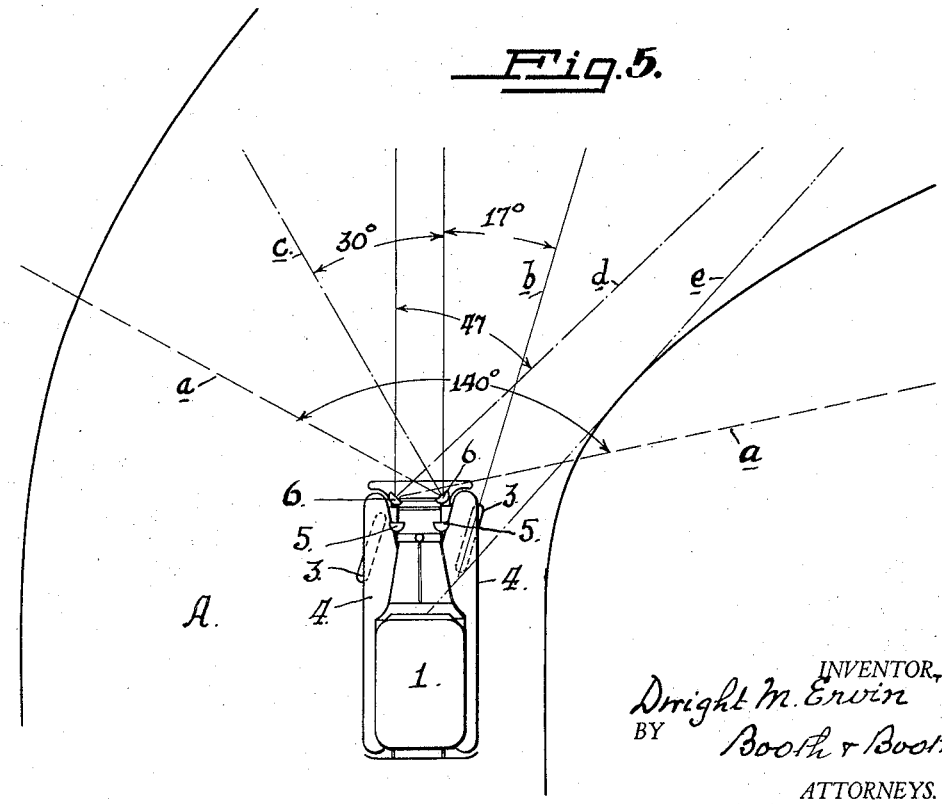

Sept. 19, 1933.    D. M. ERVIN    1,927,232
DIRIGIBLE HEADLIGHT
Filed Sept. 1, 1931    2 Sheets-Sheet 2
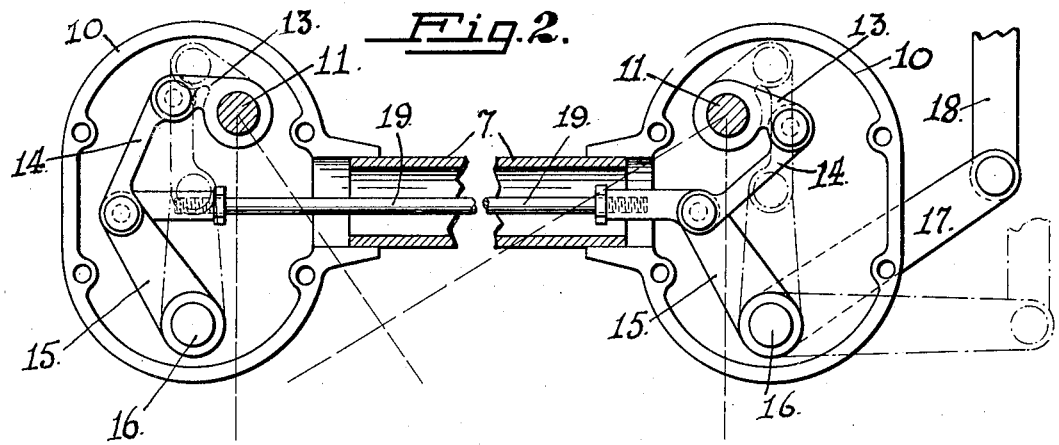
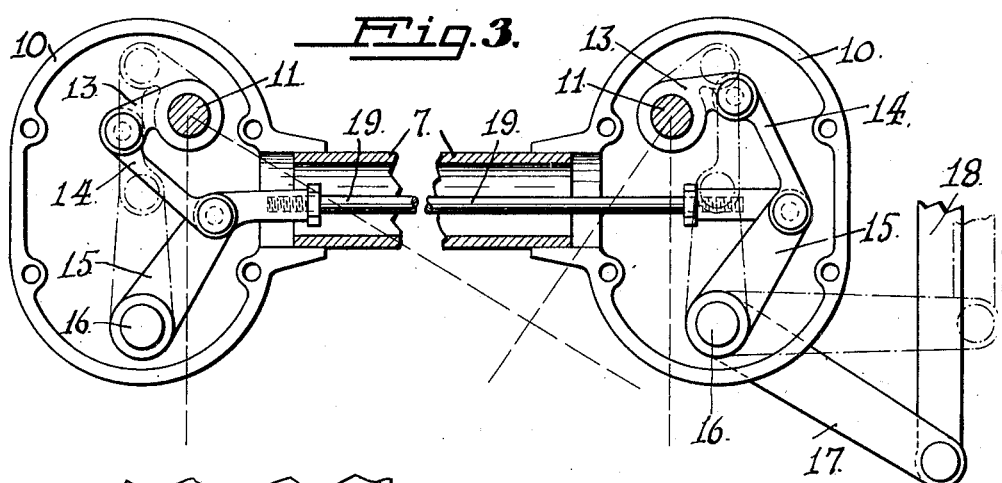
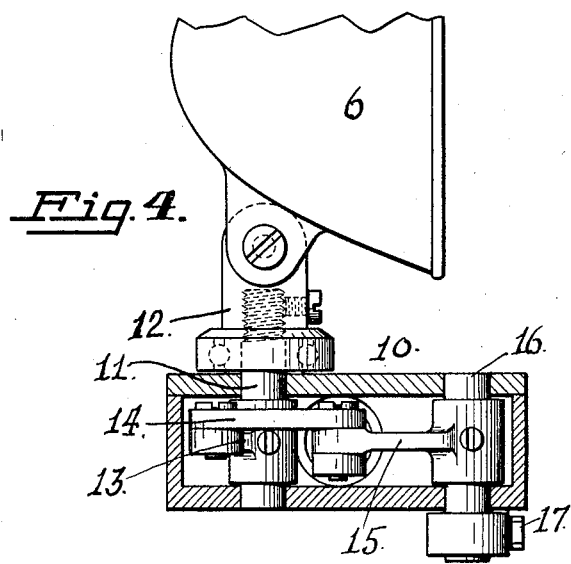
INVENTOR,
Dwight M. Ervin
BY Booth & Booth
ATTORNEYS.

Patented Sept. 19, 1933

1,927,232

UNITED STATES PATENT OFFICE 1,927,232

DIRIGIBLE HEADLIGHT

Dwight M. Ervin, San Francisco, Calif.

Application September 1, 1931. Serial No. 560,544

4 Claims. (Cl. 240—62)

My invention relates, in general, to the class of dirigible headlights; and in particular, to that type in which the beams of a pair of headlights cross each other as the vehicle turns, in order to more effectually illuminate those road areas which would otherwise be left in shadow.

My invention, briefly stated, comprises a pair of angularly adjustable headlights, adapted normally to project their beams in parallel lines directly forward in the straight road; and means actuated by the steering connections of the vehicle adapted, to turn the headlights in unison to such an angle to each other that their beams will cross on both right and left hand road turns, that headlight which, due to the direction of the road curvature, right or left, is the outer one, turning at a higher rate of speed than the other, in order to reach a greater angle which will enable its beams to fall more effectively upon the shorter-radius side of the road curve.

From the foregoing, the object of the invention will be readily understood, namely, to more effectively and to a greater extent light the entire road, illuminating all shadows and dark spots, out to the utmost side line borders of the field of vision, on both right and left hand road turns.

In the brief statement of the nature of my invention as given above, I would direct attention especially to the feature of the outer headlight of the dirigible pair, traveling at a higher rate of speed than the inner headlight, in order to reach its proper dirigible angle relatively to the other headlight without regard to the direction of the road curvature, that is to say, on both turns, right and left, because it is in this feature that the most complete lighting of both sides of the road results. I am, of course, aware of the general dirigibility of headlights, and that it is not new to separately turn one or the other of a pair of headlights to opposite sides according to the direction of the curve, so that its beams will cross the forwardly projected beams of the other headlight; and, finally, I am aware of the disclosure in the prior art of a pair of auxiliary headlights of fixed relative angularity the beams of which permanently cross, said auxiliary headlights being separately lighted and used only on a curve, being extinguished upon the straight road because of their fixed angularity. But, in no case have I found any provision for causing a pair of dirigible headlights according to the direction of the road turn to move in unison to opposite relative angularity in order to project their beams to both sides of the road, nor any provision for causing either of said pair to travel at a higher rate of speed than the other to reach its proper relative angularity.

In the accompanying drawings I have illustrated the invention in its preferred form, though it is to be understood that changes may be made without departing from the spirit of the invention as defined in the claims hereunto appended.

Fig. 1 is a front view of an automobile, showing in general outward appearance the presence of my dirigible headlights.

Fig. 2 is a plan, partly in section of the actuating mechanism of the dirigible headlights indicating a right hand turn of the road.

Fig. 3 is a similar view to Fig. 2, showing the mechanism in position indicating a left hand turn of the road.

Fig. 4 is a sectional view of one of the housing cases for the actuating levers, showing the attachment of one of the dirigible headlights.

Fig. 5 is a diagrammatic view showing an example of the relative angles of the dirigible headlight beams, and their effect.

In Fig. 1 an automobile 1 is indicated, having front axle 2, front wheels 3, fenders 4, and the usual pair of fixed headlights 5.

Referring now to Fig. 5, the road A is shown as making a right hand turn. The lines $a$ crossing from the dirigible headlights 6 subtend, for example, an arc of 140° and indicate the maximum angle of lighting. The angle of the wheel, shown by the line $b$, indicates an angle of 17°. The angle of the right light, indicated by the line $c$, is 30°, and the angle of the left light, shown by the line $d$ is 47°. The line $e$ indicates the maximum line of vision, and between this line and the line $a$ is an area lighted beyond the field of vision.

Assuming that these are the positions of the dirigible headlights 6 upon the given right hand turn, and reversed upon a similar left hand turn, and that both lights are actuated in unison by the steering mechanism of the vehicle, the following effects are predicated, to wit:—that upon the straight road the lights normally have parallel beams, while upon curves both right and left their beams cross, at independent relative rates, with the result that both sides of the curve and center of the road are lighted from in front of the vehicle to a point beyond the field of road vision.

Also that upon right hand curves the left light which lights the right part of the road must necessarily angularly move at a greater rate than the right light, because the rate that the right side of the road turns away from the driver is gretaer than the rate the left hand side approaches; while upon a left hand curve the right light angularly moves at a greater rate than the left light.

Thus, it will be seen, that by the angular movement in unison of the pair of dirigible lights in relation to the angle of the turning of the car, and at independent angles with each other, their beams cross and thus the entire road of the curve is lighted from left edge to right edge.

The actuating mechanism will now be described, reference being made to Figs. 2, 3 and 4, with a brief initial reference to Fig. 1. In this latter figure, is shown a housing member in the form of a tube 7 which is mounted upon a cross bar 8 of the vehicle frame by means of the hinged brackets 9, adapting the headlights 6 for such angular vertical adjustment as may be necessary.

Upon each end of the housing tube 7 is fitted a casing 10, in which is mounted a rotatable shaft 11, the upper projecting end of which is fitted with a bracket 12, which carries the headlight 6, as seen in Fig. 4.

Within the casings 10 are the interconnected differentially pivoted toggle lever systems for the differential angular movement of the two lights 6. Specifically, these systems comprise the arm 13 of the light axis 11, the link 14 articulated between said arm 13 and an arm 15, the other end of which is fixed to a rotatable shaft 16 mounted in the casing 10 and having its projecting end connected with the turning lever 17 which is itself connected with the rod 18 comprised in the steering mechanism (not shown) of the vehicle. Between the joint of the link 14 and arm 15 in each casing 10, and passing through the housing tube 7, extends the longitudinally adjustable tie rod 19.

Thus by the movement of the turning lever 17 under the steering effect of the vehicle, the headlights 6 are angularly adjusted in unison, but on account of the relatively different pivotal positions of the actuating toggles one or the other of said lights, according to the direction of the road curve, will turn at a faster rate and arrive at a different angle from the other, so that their beams will cross as the vehicle turns from the straight road, and will recross as it turns back into the straight road; and, finally, by providing that this difference in relative angularity be effected by the greater speed rate of that light which follows the outer arc of the road curve, its beams will illuminate fully the inner road-arc, as hereinbefore mentioned, up to and beyond the line of vision.

In Fig. 2 which indicates in full lines the position of the actuating mechanism in a right hand curve, and in dotted lines its position in the straight road, the broken beam lines indicate the differential angularity of the two lights; and the same is true of Fig. 3 which illustrates positions for a left hand curve.

I claim:—

1. Dirigible headlights for vehicles comprising a pair of horizontally spaced headlights, angularly turning in unison, under control of the vehicle steering connections; and means actuated by said steering connections on both right and left hand road curves for turning said pair to cross their beams and cause either member of said pair according to the direction of said curve to assume an angle different from that of the other member.

2. Dirigible headlights for vehicles comprising a pair of horizontally spaced headlights angularly turning in unison under control of the vehicle steering connections; and means actuated by said steering connections for adjusting said headlights in unison to cross their beams on both right and left road curves and turning that member of said pair which according to the direction of road curvature is the outer one, at a higher rate of speed relatively to the turning speed of the other member, whereby the relative angularity of the two members has a different coefficient.

3. Dirigible headlights for vehicles comprising a pair of horizontally spaced headlights, angularly turning in unison, under control of the vehicle steering connections; and means actuated by said steering connections for turning said pair to cross their beams on both right and left hand road curves and turning either member of said pair according to the direction of said curve to an angle different from that of the other member, said actuating means comprising differentially pivoted toggle-lever systems, a tie member connecting said systems for simultaneous operation, and a lever connection of one of said systems with the steering mechanism of the vehicle.

4. Dirigible headlights for vehicles comprising a pair of horizontally spaced headlights angularly turning in unison under control of the vehicle steering connections; and means actuated by said steering connections for adjusting said headlights in unison to cross their beams on both right and left hand road curves and turning, during adjustment, that member of said pair which according to the direction of road curvature is the outer one, at a higher rate of speed relatively to the turning speed of the other member, whereby the relative angularity of the two members has a different coefficient, said actuating means comprising differentially pivoted toggle-lever systems; a tie member connecting said systems for simultaneous operation, and a lever connection of one of said systems with the steering mechanism of the vehicle.

DWIGHT M. ERVIN.